United States Patent [19]

Chernick et al.

[11] 3,745,227

[45] July 10, 1973

[54] SANDWICHED EUTECTIC REACTION ANTICOMPROMISE CIRCUITS

[75] Inventors: Leon Chernick, Los Angeles; Kikuo Ichiroku, Santa Monica; Gary S. Smolker, Los Angeles, all of Calif.

[73] Assignee: The United States of America as represented by the Secretary of the Navy, Washington, D.C.

[22] Filed: Dec. 10, 1970

[21] Appl. No.: 97,453

[52] U.S. Cl. .................................. 174/68.5, 307/298

[51] Int. Cl. .................................................. H05k 1/02

[58] Field of Search .................... 174/68.5; 307/298; 317/79, 80

[56] References Cited

UNITED STATES PATENTS 3,394,218 7/1968 Foudriat ............................ 307/298

*Primary Examiner*—Benjamin A. Borchelt
*Assistant Examiner*—N. Moskowitz
*Attorney*—R. S. Sciascia and H. H. Losche

[57] ABSTRACT

An anticompromise circuit having a thin film circuit sandwiched in between two eutectic reaction films separated by electrical insulating films, the eutectic reaction films consisting of a mixture of palladium and aluminum and adapted to be coupled to a switched electrical source to produce a eutectic reaction to destroy the thin film circuit.

5 Claims, 1 Drawing Figure

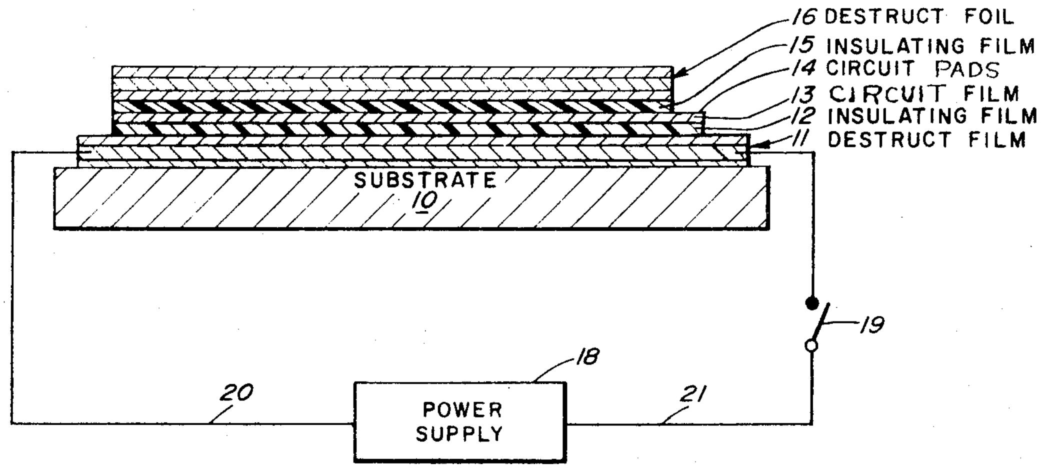
INVENTORS
LEON CHERNICK
KIKUO ICHIROKU
GARY S. SMOLKER
BY H. H. Locke
ATTORNEY

SANDWICHED EUTECTIC REACTION ANTICOMPROMISE CIRCUITS

BACKGROUND OF THE INVENTION

This invention relates to anticompromise circuits and more particularly to circuits which are destroyed at will by eutectic reaction.

In the known prior art circuit destruction is usually practiced by placing an explosive, pyrotechnic, or acid etching device on, adjacent to, or against the circuit module or modules to be destroyed. These devices would not destroy the circuit uniformly and, thus, there could be some compromise of the circuit. Another known device utilized an oxidant in one of the thin film layers of the thin film circuit so that the explosive or pyrotechnic ignition means would cause a more uniform destruction. The disadvantages are in providing space for the explosive, pyrotechnic, or acid in the already crowded circuit module area and the incomplete destruction of the circuit.

SUMMARY OF THE INVENTION

In the present invention a thin film circuit module mounted on a glass or ceramic substrate has a eutectic reaction film or coating sandwiching a thin film circuit therebetween. The thin film circuit is insulated electrically on either side by an electrically insulating film of silicon monoxide. The eutectic reaction film or coating consists of a three coating mixture of palladium-aluminum-palladium which has electrodes thereon adapted to be connected to a voltage source through a switch to produce ignition at the will of the operator. The eutectic reaction will melt the thin film circuit to render it useless, unrecognizable, and irreparable. It is accordingly a general object of this invention to provide a thin film circuit sandwiched between destruct films or layers of palladium, aluminum, and palladium mixture electrically isolated from the thin film circuit by insulating silicon monoxide films and adapted to be ignited by an electrical power source to produce self destruction and anticompromise of the circuit.

BRIEF DESCRIPTION OF THE DRAWING

These and other objects and the attendant advantages, features, and uses will become more apparent to those skilled in the art as a more detailed description proceeds when considered along with the accompanying drawing illustrating a single view in cross-section of a thin film circuit sandwiched between destruct films, all mounted on a substrate.

DESCRIPTION OF THE PREFERRED EMBODIMENT

Referring more particularly to the figure of drawing there is illustrated in cross-sectional view a circuit module built upon a substrate 10 of glass, ceramic, or any suitable electrical insulating body. Affixed to the top surface of the substrate 10 are three destruct films 11 consisting of palladium, aluminum, and palladium, in that order, by vacuum deposition in sequence. This first destruct film 11 has an electrical insulation film 12 vacuum deposited thereover. Over the film 12 is vacuum deposited a thin film (or thick film) electrical circuit 13 having terminal pad portions 14 thereon. A second electrical insulation film 15 is vacuum deposited over the thin film circuit 13 except for the terminal pads 14. Over the film 15 is vacuum deposited a second destruct film 16 consisting of the mixture of the three films of palladium, aluminum, and palladium, in that order of deposition, as for film 11.

The destruct film combinations 11 and 16 may be coupled in parallel to an electrical power supply 18 through a normally open switch 19, or only one of the destruct film combinations 11 or 16 may be so coupled, as shown by leads 20 and 21. While the second destruct film combination 16 is described hereinabove as being vacuum deposited on as thin films, a foil of palladium-aluminum-palladium, known on the commercial market by the trademark or tradename as PYROFUSE foil, may be cemented or otherwise bonded to the top insulation film 15 and electrically connected or not as desired to the power source 18. Ignition of the upper destruct foil or PYROFUSE 16 will produce a pyrotechnic or eutectic reaction which will produce sufficient heat to ignite the lower destruct film combination 11. By the same reasoning, ignition of the first destruct fim combination 11 can result in the ignition of the second destruct film or PYROFUSE 16. While the thin film circuit may consist of solid state elements, as capacitors and the like, the destruct circuit module is particularly adaptable for thin film resistors.

It has been found that, although the first or lower destruct film 11 can be ignited by an electric charge from the power supply 18, or that both the destruct film combinations 11 and 16 can be ignited simultaneously from the power supply 18, very good destruction results can be accomplished by applying the electrical energy directly to the upper or second PYROFUSE destruct film combination. The destruction of the thin film circuit will be lessened by too much or too little destruct thin film layers. It has been found that a destruct film layer thickness of about 0.005 inch thick generates enough heat to drive to completion the eutectic reaction of palladium-aluminum-palladium mixture situated beneath the PYROFUSE.

While many modifications may be made in the degrees of destruct film thickness and arrangement, we desire to be limited in the spirit of our invention only by the scope of the appended claims.

We claim:

1. An anticompromise thin film circuit sandwiched between destruct film combinations comprising:
   - a substrate from the group of electrical insulating materials such as glass and ceramic;
   - a thin film circuit sandwiched between two destruct film combination coatings with an electrical insulating film between each destruct film and said thin film circuit, said destruct film combination including three metals, one destruct film combination being molecularly affixed to said substrate; and
   - means to apply an electrical charge to said destruct films whereby said thin film circuit may be destroyed at will to avoid compromise thereof to enemy forces.

2. An anticompromise circuit as set forth in claim 1 wherein
   - said destruct film combination of three metals consists of palladium, aluminum, and palladium mixed in that order for the film coatings.

3. An anticompromise circuit as set forth in claim 2 wherein
   - said electrical insulating film consists of silicon monoxide.

4. An anticompromise circuit as set forth in claim 3 wherein said thin film circuit is a nichrome resistance.

5. An anticompromise circuit as set forth in claim 1 wherein said two destruct film combination coatings consist of films of palladium-aluminum-palladium under said thin film sandwich and of a PYROFUSE foil over said thin film circuit.

* * * * *